United States Patent Office 3,088,939
Patented May 7, 1963

3,088,939
METHOD OF MAKING A CRYSTALLIZABLE POLYMER WITH LITHIUM AS CATALYST
Mary L. Miller, New York, N.Y., assignor to American Cyanamid Company, New York, N.Y., a corporation of Maine
No Drawing. Filed July 26, 1957, Ser. No. 674,371
8 Claims. (Cl. 260—88.7)

This invention relates to crystallizable polymers. More specifically, the present invention relates to crystallizable polymers of the group consisting of acrylonitrile, methacrylonitrile, tertiary butyl acrylate and tertiary butyl methacrylate and to the crystallizable polymers obtained by the further treatment of these polymers. The invention also contemplates the novel method for deriving crystallizable and crystalline polymers from monomers of this group.

Briefly, the invention comprises the preparation of polymers having an ordered molecular arrangement characteristic of crystallinity by reacting monomers of the group consisting of acrylonitrile, methacrylonitrile, tertiary butyl acrylate and tertiary butyl methacrylate in the presence of finely dispersed lithium metal as catalyst. The crystallizable polymer obtained may subsequently be converted to the solid crystalline polymer. In a further aspect, the ester group of the crystallizable polymers of tertiary butyl acrylate or tertiary butyl methacrylate or the nitrile group of the acrylonitrile or methacrylonitrile may be converted to acid groups to form crystallizable polyacrylic acid or polymethacrylic acid, respectively. This may be accomplished, for example, by decomposing the ester groups of the polymer to carboxyl groups in the presence of a suitable acid or by hydrolysis of the nitrile group to acid or amide in the presence of a suitable acid or base.

As a still further aspect the crystallizable polyacids so prepared may be subsequently treated, for example, by refluxing in acid and with an excess of alcohol to produce the corresponding crystallizable polyesters which differ from the polyester starting material.

It is an object of the present invention to provide a novel method for preparing crystallizable and crystalline polymers of acrylonitrile, methacrylonitrile, tertiary butyl acrylate and tertiary butyl methacrylate. It is another object of the present invention to provide a novel polymeric material from these monomers. It is still another object of the invention to provide a method of making crystallizable polymers wherein crystallizable polymers of this group prepared according to the invention are employed as intermediates. It is a further object to derive novel crystallizable resinous compositions wherein the crystallizable or crystalline polymers of tertiary butyl acrylate and tertiary butyl methacrylate, acrylonitrile or methacrylonitrile are employed as intermediates. Other objects and advantages will become apparent from the more detailed description of the invention which follows.

In carrying out the process, the monomers, in a pure state, are introduced into a suitable vessel; and mixed together with a catalyst comprising a fine dispersion of metallic lithium. An inert atmosphere is maintained throughout the reaction. The polymerization occurs gradually and is allowed to proceed to a substantially solid phase. If desired, the polymerization system may utilize a suitable liquid medium which preferably behaves as a solvent for the monomer and as a swelling agent or non-solvent for the polymeric product. However, a solvent is not necessary as polymerization of the monomer to the ordered structural arrangement of crystallinity occurs solely in the presence of the lithium metal dispersion.

The fine dispersion of lithium metal catalyst to be employed may be prepared by melting the metal immersed in a petroleum jelly such as petrolatum or Vaseline and subjecting the molten mass to high speed agitation in a suitable apparatus designed and available for such purposes. No dispersing agents or other additives are tolerable. The entire operation is preferably carried out in a closed system in order to provide a contaminant free catalyst and should be conducted under an atmosphere of inert gas such as helium. The container for preparing the catalyst should be such as to preclude contamination and is preferably of stainless steel. The high speed stirrer to effect dispersion of the metal is operated at speeds of the order of 15,000 r.p.m. or higher for about 30 minutes and at a temperature of the order of about 200° C.

The catalyst is generally made as a dispersion consisting of about 10–40% metal particles having a mean diameter of below about 200 microns, preferably, a particle size not exceeding about 120 microns. The petrolatum or other viscous inert carrier serves as a dispersing medium for the metal and also protects the catalyst which is highly pyrophoric. It is necessary that the lithium metal be in a finely dispersed form inasmuch as lithium in lump form is not effective.

Additional information relating to the preparation of lithium dispersions may be found in the literature, such as the available publication entitled Product Data, 101–456, Lithium Corporation of America, Minneapolis, Minnesota.

I have found that lithium dispersions are unique catalysts in the polymerization of the monomers, acrylonitrile, methacrylonitrile, tertiary butyl acrylate and tertiary butyl methacrylate. The polymer which forms has a crystallizable or ordered molecular structural arrangement as distinguished from an amorphous polymer of random molecular arrangement in which there is little or no order in the manner in which the molecules are arranged.

When a vinyl monomer having the structure

wherein X and Y are different, is polymerized by free radicals, light or ordinary ionic catalysts, the X's are randomly oriented along the polymer chain, i.e.

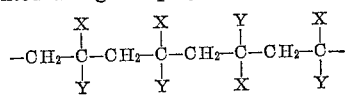

Unless X has very nearly the same size as Y, these polymers do not crystallize because the irregularity of the structure prevents the close packing of the chains needed for crystallization. If by some means the above monomer is made to polymerize in such a way that long sequences of the polymer chain have the X's oriented either all $d$ or all $l$ or alternately $d$ and $l$ with respect to the polymer chain, a molecule (or segment of a molecule) with a regularly repeating structure will result, i.e.

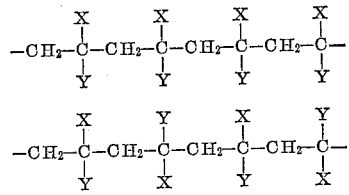

polymer chains with such regularly repeating structures will form ordered crystalline regions with a three dimensional lattice structure.

A single crystallite (i.e. crystalline region) will contain segments of many molecules and likewise a single molecule will pass through many crystalline and many amorphous regions. The three-dimensional ordered regions of the crystallite give sharp diffraction lines when examined by X-ray, while amorphous polymers appear as diffused haloes. The appearance of sharp lines in an X-ray pattern therefore is indicative of crystallinity in the polymer. Because the polymer chains in the crystalline regions are more tightly packed than in amorphous regions, polymers containing crystallinity are denser than amorphous polymers.

The strong bonding between the chains in the crystalline regions makes crystalline polymers less soluble and less readily softened by heat than amorphous polymers.

If crystalline polymers are cooled slowly from the melt the crystalline regions may take the form of small spheres or spherulites which can range in size from 0.1 micron to several millimeters. Each spherulite consists of an assemblage of crystals radiating in all directions from a central point. When examined in the polarizing microscope between crossed nicols these spherulites display a dark Maltese cross on an illuminated field. These structures are characteristic of crystalline polymers.

The denser structure of crystalline polymers often causes a splitting of some of the infrared absorption bands. In crystalline polytertiary butyl acrylate such splitting is apparent in the region between 1200 and 1300 wave numbers.

The present invention makes use of a lithium dispersion having a small particle size, i.e. a high surface area as polymerization catalyst. I have discovered that this metal catalyst has the unique capacity to form polymers of acrylonitrile, methacrylonitrile, tertiary butyl acrylate and tertiary butyl methacrylate which have the monomer units in a regular repeating arrangement. This property is not found in free radical type catalysts, nor in other metals, even sodium and potassium which are often classed with lithium as having substantially similar characteristics.

The present invention is not bound to any particular theory. However, it is believed that the applicable distinction between lithium on one hand and sodium and potassium on the other is that the latter are more electropositive than lithium, i.e. the latter are unsuitable because the valence electron in these metals is very loosely bound and therefore readily transferred to the monomer. This electron transfer in the case of sodium and potassium initiates ordinary anionic polymerization which gives amorphous polymer. Lithium, however, apparently retains its valence electron more forcefully than sodium or potassium and therefore when lithium is used either in monomer alone, or in a solvent like heptane that is unfavorable for ionization, the valence electron is not completely transferred to monomer and polymerization by the ordinary ionic mechanism operative with sodium or potassium does not take place. This leaves the way clear for polymerization by another, and possibly slower mechanism, which produces polymer with a regular repeating structure.

It is believed that in the oriented polymerization mechanism of the present invention, as the monomer unit approaches the lithium surface, the unit becomes polarized and is absorbed on the lithium surface with definite orientation. When a second monomer unit approaches and becomes polarized, it polymerizes with the first monomer unit and thereby displaces the first monomer unit. Repetition of this process results in a polymer which grows from a point on the lithium surface. Since this type of polymerization does not take place if the electron of the polymer unit is entirely transferred to the metal, highly electropositive metals like sodium and potassium and ionizing solvents like tetrahydrofuran do not provide the suitable mechanism and in fact their presence must be avoided.

As mentioned heretofore, the process of the present invention may employ the monomer alone with the lithium dispersions or the system may utilize a polymerization medium which is preferably a solvent for the monomer. When a polymerization medium is utilized, it is necessary that it be inert to the polymerization reaction taking place. Among the solvents which may be used advantageously are hexane, heptane, octane, or other aliphatic solvents or mixtures thereof, such as Varsol 1, Varsol 2, mineral spirits, deodorized petroleum, kerosene and the like. The amount of solvent when used, is not critical and may vary in amounts up to 80% or more of the weight of monomer although practical limitations are generally imposed on amounts exceeding about 75% by weight of the monomer. It will be apparent that the amount of solvent will be governed by the amount of solids content of polymeric material desired therein. These solvents may be used either singly or in combination with one another.

In the practice of the process of the present invention, the conditions of reaction may be varied rather extensively. For example, one may utilize temperatures from about −70° C. up to the boiling point of the system, namely, the reflux temperature, but it is desired for optimum results to avoid higher temperatures, which enhances thermal (amorphous) polymerization in favor of catalytic polymerization; and, as a consequence, the preferred temperature range is between about 0° C. and about ±60° C. Temperatures below 0° C. are effective although the polymerization time may be increased unduly as the temperature diminishes. Pressure is not a critical factor in carrying out the instant process inasmuch as atmospheric pressure, super-atmospheric pressure or subatmospheric pressure may be utilized. As a practical matter, atmospheric pressure is preferred.

The crystalline polymer is isolated by extracting the crystallizable polymer material with a compound which is a solvent for the noncrystalline polymer but at the same time a nonsolvent for the crystalline polymer. It will be apparent that for some uses, the separation of the crystalline polymer from the amorphous polymer formed therewith may not be necessary or desirable. Where high polymer purity is desired, the addition of a small amount of alcohol as a part of the solvent or as a precipitant for the polymer will destroy the unused catalyst.

The crystallizable polymers of acrylonitrile, methacrylonitrile, tertiary butyl acrylate and tertiary butyl methacrylate are themselves highly useful resinous compositions. They are also valuable as intermediates in the preparation of the derivatives of these monomers. For example, poly acid derivatives of tertiary butyl acrylate may be obtained by hydrolyzing the crystallizable or crystalline polymer containing the ester groups in an acid medium within a wide temperature range, e.g. between about 20° C. and 210° C. This reaction decomposes the ester groups of the polymer to produce acrylic acid groups, i.e. to form crystallizable polyacrylic acid which is also a highly useful resinous material. Isobutylene gas is evolved in the reaction.

As a further and additional feature of the invention, the crystallizable polyacrylic acid so produced may be employed as an intermediate in the preparation of a different crystallizable polymeric ester, for example, n-butyl acrylate, by esterifying the crystallizable polyacrylic acid. This esterification may be accomplished, for example, by refluxing the polyacrylic acid with an excess of a suitable alcohol in the presence of an acid, such as sulfuric acid or p-toluene sulfuric acid. The reaction product, when the crystallizable polyacrylic acid intermediate is utilized, is crystallizable n-butyl acrylate. In a like manner, crystalline and crystallizable acrylonitrile and methacrylonitrile and tertiary butyl methacrylate produced according to the invention may be used as intermediates for the preparation of other crystallizable polymers by subjecting these polymers to ordinary chemical reactions, such as hydrolysis, transesterification or other reactions that do not break the —C—C—C— chain of the polymer backbone.

The modification of these polymers without loss in their crystallizable property is possible because the ordered arrangement in the polymer which makes crystallization possible resides in the —C—C—C— linkages of the backbone with respect to the side group orientation. Therefore, any reaction on the side groups that does not break the —C—C—C— linkages of the polymer backbone will not destroy the ability of the polymer to crystallize. Each of the crystallizable polymers derived from tertiary butyl acrylate and tertiary butyl methacrylate, and acrylonitrile and methacrylonitrile as well as the crystallizable polymers derived from the further modification of these polymers such as by hydrolysis or transesterification of the polymer are novel and useful resinous compositions falling within the contemplation of the present invention.

The polymeric crystalline and crystallizable reaction products produced in accordance with the present invention find application and applicability in a plurality of uses, for example, they may be employed as adhesives, molding compositions, laminating compositions, in fiber forming or in the treatment of various materials, such as textiles which are made up either of natural or synthetic fibers including wool, linen, cotton, nylon and other synthetics or in the treatment of paper or paper pulp, wood or leather.

In order that the concept of the present invention may be more completely understood, the following examples are set forth in which all parts are parts by weight unless otherwise indicated. The examples are provided primarily for the purpose of illustration and any specific enumeration of detail should not be interpreted as a limitation except as specified in the appended claims.

*Example 1*

Equal parts of purified tertiary butyl acrylate and heptane are mixed in an atmosphere of helium with 0.25 weight percent based on monomer of metallic lithium as a dispersion in petrolatum. The particle size of this dispersion ranged from 0.1 to 80 microns. The mixture is shaken in a sealed reaction vessel at room temperature. Some polymer (insoluble in the polymerization medium) forms after 2 days and the contents of the vessel beromes almost solid in 7 days. The polymer is extracted three times at a boil with an acetone-methanol mixture 9:1 ratio. The polymer is then extracted three times with boiling acetone. Thirty-one percent of the polymer remains undissolved. This undissolved polymer is crystalline as shown by the X-ray diffraction pattern. It has a relatively higher softening point (69° C.) than the amorphous, acetone-soluble polymer (37° C.) and a higher density 1.05 as against 0.97, and gives well defined spherulites, when brought rapidly from the melt temperature of about 200° C. to 64° C. and allowed to cool there overnight.

*Example 2*

Equal parts tertiary butyl methacrylate and hexane, 0.39 weight percent lithium, based on the monomer, as a dispersion in petrolatum are introduced into a suitable reaction vessel. The mixture is maintained at 50° C. for 4 days when the contents of the vessel became solid. The reaction product is 20% acetone-soluble and amorphous and 80% insoluble in all solvents which were employed including acetone, dioxane, toluene, glacial acetic acid, and tetrahydrofuran. The insoluble portion swells in boiling phenol. The insoluble fraction on examination forms a crystalline X-ray pattern.

*Example 3*

Example 1 is substantially repeated with the exception that heptane is not employed. The lithium dispersion is mixed solely with the monomer and polymerization carried out at 50° C. without shaking. After 14 days at 50° C., the contents of reaction vessel is solid polymer. The solid product is treated with an acetone methanol mixture (90–10) to dissolve out between about 10–20% soluble polymer. The acetone insoluble portion gives a crystalline X-ray pattern. The intrinsic viscosity of the acetone insoluble portion when dissolved in chloroform at 30° C. is 2.50.

*Example 4*

A lithium dispersion, 1.0 weight percent based on monomer, is mixed with 10 parts of tertiary butyl acrylate and the mixture shaken and maintained at room temperature and under an inert atmosphere. After 10 days, the contents of the vessel have thickened. 24% of the polymer is acetone-insoluble and gives a crystalline pattern when examined by X-ray.

*Example 5*

Equal volumes of purified acrylonitrile and purified heptane are deaerated, flushed with helium and sealed in a reaction vessel. 0.259 weight percent lithium, based on the weight of monomer, as a dispersion in petrolatum was added from a side tube. The three components are well mixed at room temperature. After four days fluffy insoluble polymer appeared. After six days, the polymer is removed from the vessel and extracted three times with boiling methanol. The polymer has only slight solubility in cold dimethyl formamide. The polymer has a molecular weight of about 200,000 and an intrinsic viscosity of 2.43 as determined in dimethyl formamide at 30° C. The sharp lines in the X-ray diffraction pattern demonstrates the crystalline structure of this polymer.

*Example 6*

Equal parts of crystalline polytertiary butyl acrylate prepared as in Example 1 is heated in a loosely covered glass dish containing a few drops of concentrated HCl at 145° C. for there days. This caused the decomposition of the tertiary butyl acrylate polymer to give polyacrylic acid (crystallizable) and isobutylene (gas), i.e.

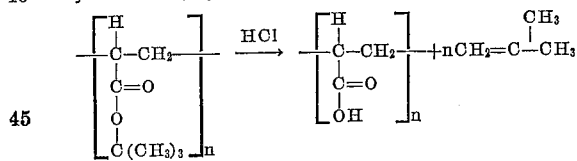

The polyacrylic acid formed in this way, even without any additional treatment designed to induce crystallinity gave an X-ray pattern that was much sharper than the diffuse haloes given by ordinary amorphous polyacrylic acid.

*Example 7*
[Comparative]

(a) 15 parts acrylonitrile, 15 parts hexane and 0.15 part sodium as a 10% dispersion in petrolatum was mixed in a nitrogen atmosphere and maintained at room temperature for seven days. The reaction product had a polymer content of 30%. On examination, the polymer exhibited an amorphous X-ray pattern. The polymeric product is light yellow and has a molecular weight of about 15,000.

(b) The procedure of Example 7(a) is repeated with the exception that potassium dispersion is employed instead of sodium. A 50% polymeric product is obtained. The polymer has an off-white color and a molecular weight of about 55,000. The X-ray pattern shows the polymer to be amorphous.

(c) 15 parts tertiary butyl acrylate, 15 parts tetrahydrofuran and 0.30 part lithium dispersion are mixed in a helium atmosphere and maintained at 50° C. for 28 days. The resulting product is an oily liquid only. Example 7(c) is illustrative of the fact that a source of ions, i.e. the ionizing solvent for the monomer, prevents the formation of crystallizable polymer.

I claim:
1. A method of preparing crystallizable polymers which comprises mixing a monomeric compound selected from the group consisting of acrylonitrile, methacrylonitrile, tertiary butyl acrylate and tertiary butyl methacrylate with a catalyst system consisting essentially of lithium metal, in a finely dispersed condition and having a particle size not exceeding 200 microns, in amounts of from about 0.01% to 5%, based on the weight of said monomeric compound, and polymerizing said mixture in an inert atmosphere, wherein the monomeric compound is dissolved in an organic medium which is a solvent for said compound and substantially a nonsolvent for the polymer of said compound.

2. A method of preparing a crystallizable polymer which comprises mixing monomeric acrylonitrile with a catalyst system consisting essentially of lithium metal, in a finely dispersed condition and having a particle size not exceeding 120 microns, in amounts of from about .05% to 1%, based on the weight of said monomeric acrylonitrile, and polymerizing said mixture in an inert atmosphere, wherein the monomeric acrylonitrile is dissolved in an organic medium which is a solvent for said acrylonitrile and substantially a nonsolvent for the polymer of said acrylonitrile.

3. A method of preparing a crystallizable polymer which comprises mixing monomeric tertiary butyl acrylate with a catalyst system consisting essentially of lithium metal, in a finely dispersed condition and having a particle size not exceeding 120 microns, in amounts of from about .05% to 1%, based on the weight of said monomeric tertiary butyl acrylate, and polymerizing said mixture in an inert atmosphere, wherein the monomeric tertiary butyl acrylate is dissolved in an organic medium which is a solvent for said tertiary butyl acrylate and substantially a nonsolvent for the polymer of said tertiary butyl acrylate.

4. A method of preparing a crystallizable polymer which comprises mixing monomeric tertiary butyl methacrylate with a catalyst system consisting essentially of lithium metal, in a finely dispersed condition and having a particle size not exceeding 120 microns, in amounts of from about .05% to 1%, based on the weight of said monomeric tertiary butyl methacrylate, and polymerizing said mixture in an inert atmosphere, wherein the monomeric tertiary butyl methacrylate is dissolved in an organic medium which is a solvent for said tertiary butyl methacrylate and substantially a nonsolvent for the polymer of said tertiary butyl methacrylate.

5. A process of preparing crystallizable polyacrylic acid which comprises mixing monomeric tertiary butyl acrylate with a catalyst system consisting essentially of lithium metal, in a finely dispersed condition and having a particle size of below about 120 microns, in amounts of from about .05% to 1%, based on the weight of said monomeric tertiary butyl acrylate, polymerizing said mixture in an inert atmosphere, separating the crystallizable polymeric reaction product and hydrolyzing said reaction product in the presence of an acid until the ester groups of said polymeric reaction product are substantially decomposed to carboxyl groups, wherein the monomeric tertiary butyl acrylate is dissolved in an organic medium which is a solvent for said tertiary butyl acrylate and substantially a nonsolvent for the polymer of said tertiary butyl acrylate.

6. A process of preparing a crystalline polymer of monomeric acrylonitrile which comprises mixing said monomeric acrylonitrile with a catalyst system consisting essentially of lithium metal, in a finely dispersed condition having a particle size not exceeding 120 microns, in amounts of from about .05% to 1%, based on the weight of said monomeric acrylonitrile, polymerizing the mixture in an inert atmosphere and separating the crystalline polymeric product by extracting said product with a compound which is a nonsolvent for the crystalline polymer and a solvent for the noncrystalline polymer, wherein the monomeric acrylonitrile is dissolved in an organic medium which is a solvent for said acrylonitrile and substantially a nonsolvent for the polymer of said acrylonitrile.

7. A process of preparing a crystalline polymer of monomeric tertiary butyl acrylate which comprises mixing said monomeric tertiary butyl acrylate with a catalyst system consisting essentially of lithium metal, in a finely dispersed condition and having a particle size not exceeding about 120 microns, in amounts of from about .05% to 1%, based on the weight of said monomeric tertiary butyl acrylate, polymerizing the mixture in an inert atmosphere and separating the crystalline polymeric product by extracting said product with a compound which is a nonsolvent for the crystalline polymer and a solvent for the noncrystalline polymer, wherein the monomeric tertiary butyl acrylate is dissolved in an organic medium which is a solvent for said tertiary butyl acrylate and substantially a nonsolvent for the polymer of said tertiary butyl acrylate.

8. A process of preparing a crystalline polymer of monomeric tertiary butyl methacrylate which comprises mixing said monomeric tertiary butyl methacrylate with a catalyst system consisting essentially of lithium metal, in a finely dispersed condition and having a particle size not exceeding about 120 microns, in amounts of from about .05% to 1%, based on the weight of said monomeric tertiary butyl methacrylate, polymerizing the mixture in an inert atmosphere and separating the crystalline polymeric product by extracting said product with a compound which is a nonsolvent for the crystalline polymer and a solvent for the noncrystalline polymer, wherein the monomeric tertiary butyl methacrylate is dissolved in an organic medium which is a solvent for said tertiary butyl methacrylate and substantially a nonsolvent for the polymer of said tertiary butyl methacrylate.

References Cited in the file of this patent

UNITED STATES PATENTS

| | | |
|---|---|---|
| 2,087,469 | Chalmers | July 20, 1937 |
| 2,135,443 | Strain | Nov. 1, 1938 |
| 2,264,811 | Rothrock | Dec. 2, 1941 |
| 2,327,080 | Walker | Aug. 17, 1943 |
| 2,412,034 | D'Alelio | Dec. 3, 1946 |
| 2,577,677 | Grouch | Dec. 4, 1951 |
| 2,608,555 | Bullitt | Aug. 26, 1952 |
| 2,744,886 | Protzman | May 8, 1956 |
| 2,832,759 | Nowlin et al. | Apr. 29, 1958 |
| 2,841,574 | Foster | July 1, 1958 |

OTHER REFERENCES

Schildknecht: "Polymer Processes," pub. by Interscience Publishers (1956), pages 220–223.
Miller et al.: Chem. & Ind., #41, 1323–4 (1958).
Fox et al.: J. Am. Chem. Soc., 80, 1768–9 (1958).
Fox et al.: J. Poly Sci., 31, 173–7 (1958).
Williams et al.: J. Am. Chem. Soc., 78, 1260 (1956).
Beaman: J. Am. Chem. Soc., 70, 3115 (1948).
Tobolsky: Amer. Scientist, 45, pp. 34–43 (1957), p. 35 relied on.
Landler: Rec. Des. Trav. Chem. Des, Pays-Bas, 68, pp. 992–8 (1949).
Stavely: Ind. Eng. Chem., 48, 778 (1956).